United States Patent [19]
Cook

[11] Patent Number: 4,733,955
[45] Date of Patent: Mar. 29, 1988

[54] REFLECTIVE OPTICAL TRIPLET HAVING A REAL ENTRANCE PUPIL

[75] Inventor: Lacy G. Cook, Hawthorne, Calif.

[73] Assignee: Hughes Aircraft Company, Los Angeles, Calif.

[21] Appl. No.: 851,325

[22] Filed: Apr. 14, 1986

[51] Int. Cl.$^4$ .................. G02B 17/06; G02B 23/06
[52] U.S. Cl. ........................... 350/620; 350/622
[58] Field of Search ............ 350/620, 619, 622, 618, 350/505, 442, 443, 445

[56] References Cited

U.S. PATENT DOCUMENTS

| | | | |
|---|---|---|---|
| 3,049,054 | 8/1962 | Waland | 350/442 |
| 3,674,334 | 7/1972 | Offner. | |
| 3,963,328 | 6/1976 | Abel | 350/443 |
| 4,240,707 | 12/1980 | Wetherell. | |
| 4,265,510 | 5/1981 | Cook | 350/620 |
| 4,632,521 | 12/1986 | Korsch. | |

FOREIGN PATENT DOCUMENTS

| | | | |
|---|---|---|---|
| 1393577 | 2/1965 | France. | |
| 3058 | of 1903 | United Kingdom | 350/619 |

OTHER PUBLICATIONS

I. M. Egdall, "Manufacture of a Three Mirror...", *Optical Engineering*, vol 24, No. 2, Mar./Apr. 1985, pp. 285-289.

D. Korsch, "A Three-Mirror...", *Optical Engineering*, vol. 14, No. 6, Nov./Dec. 1975, pp. 533-535.

David R. Shafter, *SPIE vol. 179 Instrumentation in Astronomy III* (1979), pp. 19-23.

Dietrich Korsch, *Appl. Opt.*, vol. 19, No. 21, Nov. 1980, pp. 3640-3645.

*Primary Examiner*—Jon W. Henry
*Attorney, Agent, or Firm*—L. B. Sternfels; A. W. Karambelas

[57] ABSTRACT

A non-relayed optical system is used off-axis in both aperture and field angle relative to an optical axis (32), and employs three reflective lens elements (34, 36, 38). The system is useful for viewing radiation from a distant object, the radiation allowed to enter the system through an opening in a real and accessible entrance pupil (44) that is disposed in front of a concave primary mirror (34). Because the entrance pupil of the system is real and not virtual, the aperture stop of the system is coincident with the entrance pupil, resulting in a significant reduction in beam wander about the front of the optical system. The real entrance pupil of the system also allows the system to be utilized for applications where it is required that the system view distant objects by means of a small viewing port, window or object space scan mirror.

9 Claims, 4 Drawing Figures

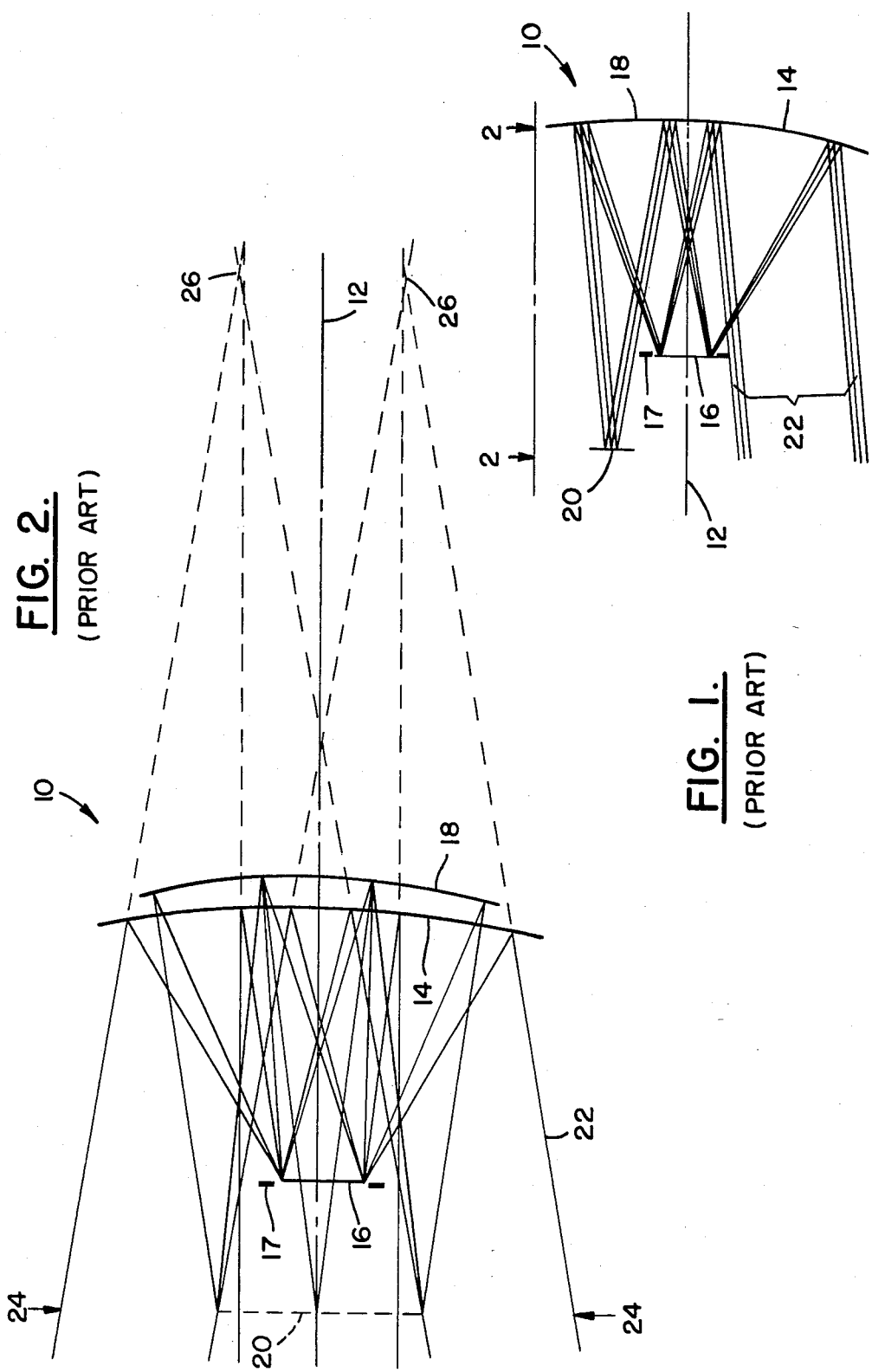

REFLECTIVE OPTICAL TRIPLET HAVING A REAL ENTRANCE PUPIL

BACKGROUND OF THE INVENTION

This invention relates to imaging systems for electromagnetic radiation and, more particularly, to a system comprised of multiple reflecting elements having a real entrance pupil located in front of the imaging system.

Imaging systems for electromagnetic radiation, especially that portion of the radiation spectrum corresponding to visual and infrared radiation, are widely used. Of particular interest is the imaging of objects at long distances by telescope.

The optical elements of a telescope may be either refractive or reflective. The minimum number of such elements is generally recognized to be three, in order to provide the minimum number of parameters which are necessary to correct for spherical aberration, coma, astigmatism and field curvature. A telescope or imaging system which is comprised of three optical elements is generally known as a triplet.

One common type of triplet is constructed utilizing refractive optical elements, and is typically comprised of a negative lens interposed between two positive lenses.

The refracting triplet, although effective in controlling aberations and, thus, useful in many imaging applications, is not completely satisfactory for others. One significant disadvantage of the refracting triplet is that applications which require a large aperture are not readily accomodated. This disadvantage arises from the expense and difficulty encountered in accurately fabricating large lens elements. Such large lens elements also have a tendency to flex when pointed in various directions, such flexure resulting in an overall loss of image quality. Another disadvantage of the refracting type of imaging system is that the lens material may not be totally transparent to the wavelength or range of wavelengths of interest. Any absorption of the radiation of interest by the lens elements will naturally result in a degradation of image quality.

In order to overcome these disadvantages, it has been known in the prior art to use reflecting optical elements, such as mirrors, in order to focus the radiation to be observed. Reflecting optical elements are advantageous for many large aperture applications in that they are often less difficult to construct in large sizes than a corresponding refracting lens element. Also, reflecting elements can be made arbitrarily thick, therefore minimizing the problem of flexure. Also, a reflecting element can be made of materials which make the element lighter in weight than a corresponding refractive element, thus making them more suitable for airborne and outer space applications. Furthermore, reflective optical systems avoid the wavelength transparency problems of refractive optical elements.

Many prior art reflecting triplets are constructed such that light, entering the system from a distant object, first impinges on a primary mirror, is reflected onto a secondary mirror, then further reflected to a tertiary mirror and finally is focused to an image plane where an image of the distant object is formed.

A particular disadvantage of many prior art reflecting triplets arises from the arrangement of the optical elements. Typically, all three mirrors are aligned such that they lie on the optical axis of the optical system, resulting in their field of view also being along the optical axis. This arrangement results in the occlusion of a significant portion of the light entering the system from a distant object. This prior art arrangement of mirrors also results in a restriction of the field of view of the system and affects the power distribution between mirrors. Also, this design has the disadvantage that it is difficult to provide adequate baffling so that stray light can be prevented from reaching the image plane.

In order to overcome these disadvantages, it has been known in the prior art to construct a reflecting triplet optical system wherein the field of view is eccentic, that is, the field of view is not along the optical axis of the system but lies entirely to one side of it.

Representative of such an eccentric triplet optical system is U.S. Pat. No. 4,240,707, to W. Wetherell and D. Wemble, which patent is incorporated herein by reference. In the Wetherell patent there is described an all-reflecting, eccentric field, non-relayed optical system. This system is comprised of a reflective triplet having an aperture stop on the optical axis, the aperture stop being physically located on the secondary mirror. The entrance pupil of this prior art optical system is virtual, that is, it is located a large distance behind the optical system.

A disadvantage of such a prior art optical system arises because the entrance pupil is virtual, namely that a significant amount of beam wander will occur in front of the optical system. Such beam wander detrimentally affects the image quality in situations wherein the optical system must view through a small viewing port.

U.S. Pat. No. 4,265,510, assigned to the assignee of the present invention, which patent is herein incorporated by reference, describes an all-reflective, eccentric field, relayed, off-axis optical system having an entrance pupil in front of the primary mirror and an aperture stop positioned between the tertiary mirror and the image plane. Inasmuch as this is a relayed optical system, a field stop is positioned between the secondary and the tertiary mirrors at the point where an intermediate image is formed. This approach is particularly useful where the rejection of stray radiation is of great concern.

The real entrance disclosed in the aforementioned prior art, U.S. Pat. No. 4,265,510, acts to reduce beam wander, and, because the optical system is relayed, it has the advantage of allowing a field stop and aperture stop components to be contained within the optical system. However, for applications where the rejection of stray radiation is not of great concern, this prior art is subject to certain problems, among which the following are illustrative. The system tends to be large in size due to the size of its optical elements and the space required between them. It requires greater total optical power to form a pair of images, the first of which is located at the field stop and the second of which is re-imaged at the point where the image is sensed and, as a result of the greater total optical power needed, the system is subject to increased image quality degradation resulting from misalignments. The field of view is also limited in size.

SUMMARY OF THE INVENTION

The foregoing problems are overcome and other advantages are realized by a reflective, off-axis, non-relayed, triplet optical system having a real and accessible entrance pupil positioned in front of the optical system.

In accordance with an embodiment of the invention, the optical system comprises a three element mirror system comprising a positive concave primary mirror, a negative convex secondary mirror and a positive concave tertiary mirror, the mirrors being arranged such that the system formed thereby is used off-axis in both aperture and field angle. Positioned in front of the primary mirror is an entrance pupil for admitting into the optical system the radiation to be imaged.

In the optical system provided by the invention, the aperture stop and the entrance pupil are degenerate, that is, the aperture stop is coincident with the entrance pupil. Therefore there is, by definition, no beam wander as a function of field of view, because the apertures for all field angles coincide at the entrance pupil.

The resultant optical system, in accordance with the invention, is well suited for relatively fast system speeds for both two dimensional and high aspect ratio fields of view of varying sizes.

BRIEF DESCRIPTION OF THE DRAWINGS

The foregoing aspects and other features of the invention are explained in the following description taken in connection with the accompanying drawings wherein:

FIG. 1 is a side elevational schematic illustrating a typical prior art three mirror, eccentric, nonrelayed optical system;

FIG. 2 is a plan view thereof taken along the line 2—2 of FIG. 1;

DETAILED DESCRIPTION OF THE INVENTION

Figure 3:
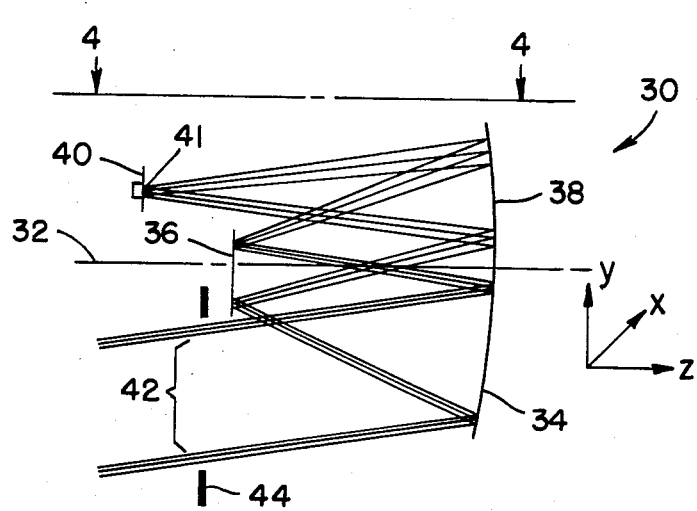
FIG. 3 is a side elevational schematic, taken in a tangential plane, of the preferred embodiment of the three mirror optical system of the invention.

In order to facilitate an understanding of the specific features and advantages afforded by the invention, a brief review of the prior art will be undertaken. Accordingly, FIGS. 1 and 2 illustrate an all-reflective, three element, eccentric, non-relayed optical system of the prior art, which system may be used for imaging distant objects. As shown, an optical system in the form of a reflecting triplet, generally designated by the reference number 10, has an optical axis 12 and comprises a positive primary mirror 14, a negative secondary mirror 16, a positive tertiary mirror 18 and an image sensor 20. An aperture stop 17 is symetrically disposed about optical axis 12 and is physically located at the periphery of the secondary mirror 16. All of the optical elements are mounted in their respective positions by conventional structure (not shown).

In operation, light emanating from a distant object (not shown) will be reflected by the elements of the optical system 10 as illustrated by beam 22 and be imaged on sensor 20.

The disadvantage of this prior art non-relayed triplet is made evident by an inspection of FIG. 2. The dotted extensions of beam 22 intersect at convergence points 26, which points 26 define the virtual entrance pupil of the optical system 10. The virtual entrance pupil so defined can be seen to be symmetrically disposed about the optical axis 12 and to lie behind the optical system 10.

The presence of the virtual entrance pupil results in a large beam wander, generally illustrated by the arrows 24, in front of the optical system 10. This large beam wander 24 adversely affects the quality of the image reaching sensor 20 so as to substantially preclude use of the system 10 in situations requiring the viewing of objects via a port or window.

Figure 4:
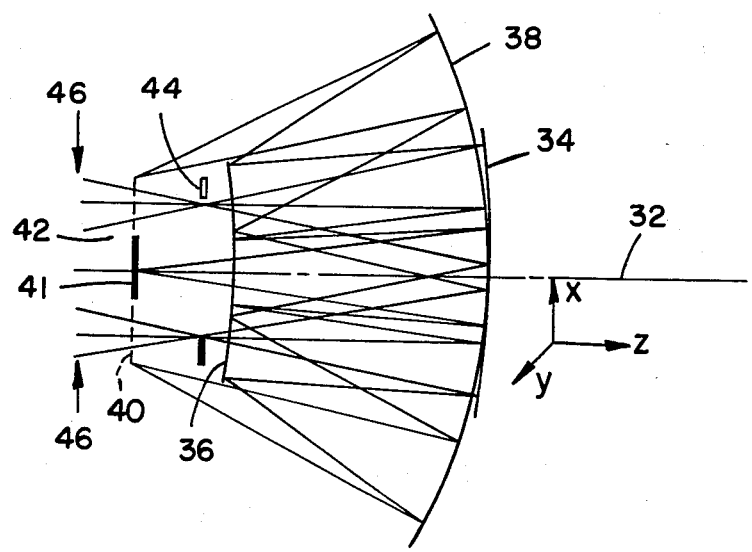
FIG. 4 is a plan view thereof, taken in a sagittal plane along the line 4—4 of FIG. 3.

Referring now to FIGS. 3 and 4, there is disclosed an eccentric, three element, non-relayed optical system 30 having a real and accessible entrance pupil 44 in accordance with the invention. System 30 has an optical axis 32 and comprises an off-axis positive concave primary mirror 34, an on-axis negative convex secondary mirror 36, an off-axis positive concave tertiary mirror 38, and an image plane 40. Disposed on image plane 40 is typically an image sensor 41. The real pupil 44 is located off-axis and admits a radiation beam 42 emanating from a distant source (not shown). As shown, beam 42 impinges initially on primary mirror 34, and then reflects sequentially upon secondary mirror 36 and tertiary mirror 38, to impinge on image sensor 41, which is the desired result.

Real entrance pupil 44, provided by the invention, results in an optical system having several advantages over those found in the prior art.

One such advantage is that the off-axis entrance pupil 44 is coincident with an aperture of the optical system 30. Therefore, the aperture is off-axis and is not required to be located at the on-axis secondary mirror 36, as was required by the aforementioned prior art non-relayed optical system.

Real entrance pupil 44, by definition, precludes the presence of a virtual entrance pupil. Thus, the disadvantage of the large beam wander of the prior art optical system 10 is overcome, as can be readily seen by comparing the locations of rays at the edges of the field of view, generally indicated by the arrows 46, of system 30 to that present in the prior art system 10 as indicated by arrows 24 of FIG. 2. This significant reduction in beam wander results in improved image quality in the optical system 30 as provided by the invention.

Another advantage to be gained from real entrance pupil 44, as provided by the invention, is that the entrance pupil can be made small, therefore making it compatible with imaging applications where a viewing window is required.

One type of viewing window (not shown) that may be utilized with real entrance pupil 44 is a vacuum window. Typically, a vacuum window is required in a cryogenically cooled, Dewar-like optical system, wherein an assembly containing the optical elements and an image sensor sensitive to radiation is evacuated such that it may be maintained at cryogenic temperatures. Such a cryogenically cooled optical system is utilized, typically, to image radiation of the infrared region of the spectrum.

Another imaging application in which a viewing window may be required is in an optical system which is designed to receive radiation through a viewing port, such as an optical system designed for use aboard an airplane or a spacecraft.

A further imaging application where a real and accessible entrance pupil is advantageous is one where an object space scanning or pointing mirror is kept small in size, relative to the collecting aperture by its close proximity to the entrance pupil.

Still one further imaging application where the relatively small potential size of the entrance pupil 44, as provided by the invention, is advantageous is the situation wherein the optical system 30 views distant objects through an exit pupil of yet another optical system, such as a focal telescope. In such an application the optical system 30 may function as an imager for the focal telescope. A typical requirement of an imager is that the entrance pupil of the imager match the relatively small exit pupil of the focal telescope. Thus it can be seen that the potentially small size of the entrance pupil 44, afforded by the invention, makes optical system 30 suitable for use as an imager for a focal telescope having a small exit pupil.

The aforesaid large beam wander about the virtual entrance pupil of the prior art optical system 10 makes such a system unsuitable for the various valuable applications listed above.

As may be well appreciated, the optical system 30 of the invention may take on many different embodiments depending on the requirements of the intended application. For example, if an intended application requires that optical system 30 be used with a vacuum window in the aforementioned cryogenic application, the area and shape of the vacuum window will determine the corresponding area and shape of entrance pupil 44. Likewise, in an airborne application the size of the viewing window and other considerations, such as the physical dimensions and weight of the optical system 30, may affect the specific embodiment of the invention. Therefore, the determination of the placement of the optical components, their respective sizes and curvatures, and other important features of the specific embodiment are most readily accomplished with computer-aided design techniques, particularly ray tracing, which are currently in use for the design of optical systems. In addition, the digital description of optical surfaces, as provided by a digital computer, has the requisite format for the driving of automatic grinding machines currently in use in the manufacture of optical elements.

The optical system 30, as provided by the invention, is well suited for relatively fast system speeds in the range of, typically, F/3.0 to F/4.0. The optical system 30 is also well suited for both two-dimensional and high aspect ratio fields of view, a typical high aspect ratio field of view being 20° by 1°. Both conic and general aspheric mirror geometries may be utilized in the various embodiments which are made possible by the invention. The invention also provides an optical system 30 which may attain various levels of image quality, such image quality being typically in the range of 10 to 100 microrads.

A specific prescription for the system 30 is given in the following TABLE. The optical characteristics of an embodiment of system 30 constructed in accordance with the specific prescription, e.g., computer generated, are a field of view of 1° in a tangential plane and 20° in a sagittal plane. The entrance pupil 44 has a diameter of ten units of linear measurement, i.e., inches or centimeters. The effective focal length is 40 units, resulting in an F number of F/4.0. The off-axis angle to the center of the field of view in the tangential plane is 8°.

As a further aid to interpretting the significance of the tabulated data set forth in the TABLE, the following comments may be made.

The column designated RD, (LINEAR DIMENSION) is the radius in units of linear dimension, e.g., inches or centimeters of the specific mirror surfaces. The minus sign indicates that the center of curvature is to the left of the mirror surface. The next column, designated CC, is the conic constant which is equal to the negative squared value of the eccentricity of a conic section (a planar cut through a double sheeted conic surface). The surface of the primary mirror 34 has the shape of a hyperboloid. The secondary mirror 36 has the shape of an ellipsoid. The tertiary mirror 38 has the shape of an oblate spheroid which may also have some aspheric correction measured in terms of the fourth power of a radius measured in an xy plane normal to the optical axis of the optical system. The correction is in terms of the fourth power of this radius.

With respect to a coordinate system, the optical axis 32 is taken as the z axis passing through the center of the primary mirror 34. The y axis is taken in the tangential plane, and the x axis is taken in the sagittal plane. With reference to the view of the optical system 30 taken in the tangential plane, FIG. 3, the z axis points to the right, the y axis points upward, and the x axis points into the paper. With respect to the view of the optical system 30 taken in the sagittal plane, FIG. 4, the z axis points to the right, the x axis points up, and the y axis points out of the page.

In the next column of the table, designated Z, (LINEAR DIMENSION), the distance refers to the vertex of each mirror surface as measured along the z axis. The minus sign indicates that the distance is to the left of the vertex of the primary mirror 34. The next column describes the tilt. Each of these mirror surfaces is formed as a surface of revolution, this being done by revolving a conic section about an axis. This axis may be parallel to the z axis, or may be tilted in the yz plane (but not the xz plane). The positive number of degrees of tilt represents a tilting in the counterclockwise direction with reference to the xyz coordinate system.

With respect to the revolving of the conic section about an axis, in the case of revolution of an ellipse, such revolution can take place about a major axis or a minor axis of the ellipse. In the case of the primary mirror 34 and the secondary mirror 36, such revolution is about a major axis, this being indicated by the minus sign of the conic constant. However, in the case of the oblate spheroid of the tertiary mirror 38, the surface is produced by revolving an ellipse about its minor axis. This may be described mathematically by representing the eccentricity by a complex number wherein the eccentricity is pure imaginary. Therefore, squaring the eccentricity gives an additional minus sign making the conic constant positive as is indicated in the table for the tertiary mirror.

The last column of the table, designated YD (LINEAR DIMENSION), is the decentering distance. The decentering is measured in units of linear measurement along the y axis, and represents a displacement of the vertex of a surface from the origin of the coordinate system.

The decentering, or positioning of the vertex of each mirror or other optical element is accomplished prior to the implementation of the angle of tilt.

TABLE

Prescription of a specific embodiment of system 30

| # | DESCRIPTION | RD, (LINEAR DIMENSION) | CC | Z, (LINEAR DIMENSION) | TILT (DEG.) | YD (LINEAR DIMENSION) |
|---|---|---|---|---|---|---|
| 44 | ENTRANCE PUPIL | ∞ | — | −22.778 | — | −9.0 |
| 34 | PRIMARY MIRROR | −77.237 | −2.023 | 0 | — | — |
| 36 | SECONDARY MIRROR | −26.662 | −0.4924 | −20.0 | — | — |
| 38 | TERTIARY MIRROR | −38.987 | 0.1906* | 0 | 1.158 | 0.9874 |
| 40 | IMAGE PLANE | ∞ | — | −27.488 | 1.014 | — |

*GENERAL ASPHERIC COEFFICIENT $R^4$ IS $0.10304 \times 10^{-6}$.

It should be understood that the above described embodiment of the invention is illustrative only and that modifications thereof may occur to those skilled in the art. Accordingly, this invention is not to be regarded as limited to the embodiment disclosed herein, but is to be limited only as defined by the appended claims.

What is claimed is:

1. An all-reflecting, non-relayed optical system having means defining at least three mirrors for imaging distant objects, said optical system having an optical axis and an aperture stop, comprising:
   means defining a primary mirror for receiving radiation from said objects;
   means defining a secondary mirror for receiving radiation reflected from said primary mirror means;
   means defining a tertiary mirror for receiving radiation reflected from said secondary mirror means;
   means defining an image plane for receiving radiation reflected from said tertiary mirror means for forming an image of said distant object;
   means defining an entrance pupil disposed in front of said primary mirror means, said pupil means enabling admission of said radiation to impinge on said primary mirror means; and wherein
   said pupil means is coincident with the aperture stop of said optical system.

2. An optical system as defined in claim 1 wherein said secondary mirror means is substantially symmetrically disposed about said axis, and wherein said primary mirror means, said tertiary mirror means, said image plane means, and said pupil means are located substantially off said axis.

3. An optical system as defined in claim 2 wherein said primary mirror means is defined to have a positive concave curvature, said secondary mirror means is defined to have a negative convex curvature, and said tertiary mirror means is defined to have a positive, concave curvature.

4. An optical system as defined in claim 3 further comprising means defining an image sensor disposed along said image plane means, said sensor means sensing said image.

5. An all-reflecting, non-relayed optical system having means defining at least three mirrors for imaging distant objects, said optical system having an optical axis and comprising:
   means defining an off-axis concave primary mirror for receiving radiation from said objects;
   means defining an on-axis convex secondary mirror for receiving radiation reflected from said primary mirror means;
   means defining an off-axis concave tertiary mirror for receiving radiation from said secondary mirror means;
   means defining an off-axis image sensor disposed along an image plane, said sensor means receiving radiation reflecting from said tertiary mirror means, said radiation reflecting from said tertiary mirror means being an image of said distant objects;
   means defining an off-axis entrance pupil disposed in front of said primary mirror means, said pupil means having means defining an opening for admitting radiation from said objects; and
   means defining an aperture stop coincident with said entrance pupil means.

6. An optical system as defined claim 5 wherein said coincident aperture stop and entrance pupil means permits the system to be optically coupled to a minimum sized viewing port within an airborne vehicle.

7. An optical system as defined in claim 5 wherein said coincident aperture stop and entrance pupil means permits the system to be optically coupled to a minimum sized vacuum window of a Dewar-like cryogenically cooled enclosure.

8. An optical system as defined in claim 5 wherein said coincident aperture stop and entrance pupil means permits the system to be optically coupled to a minimum sized exit pupil of a focal telescope.

9. An optical system as defined in claim 5 wherein said coincident aperture stop and entrance pupil means permits the system to be optically coupled to a minimum sized object space scanning mirror.

* * * * *